May 12, 1942.  P. McK. DEELEY  2,282,459
ELECTROLYTIC CAPACITOR
Filed Aug. 30, 1940
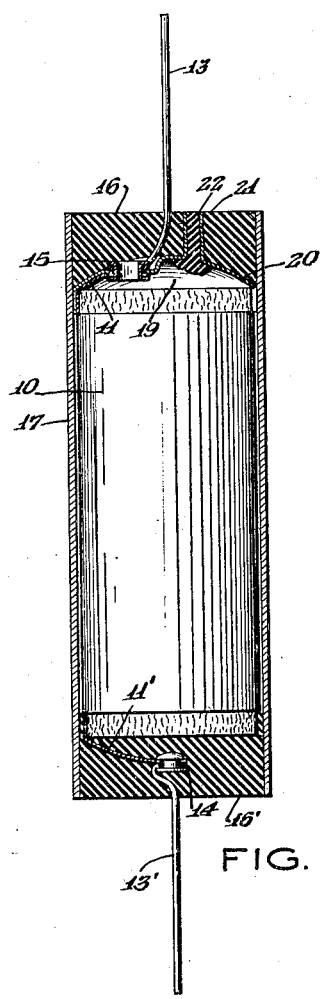
FIG.I.
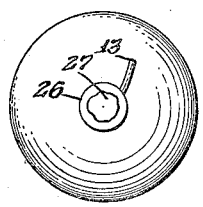
FIG. 2
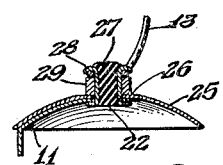
FIG.3.
INVENTOR.
Paul McKnight Deeley
BY
ATTORNEY.

Patented May 12, 1942

2,282,459

UNITED STATES PATENT OFFICE 2,282,459

ELECTROLYTIC CAPACITOR

Paul McKnight Deeley, Plainfield, N. J., assignor to Cornell-Dubilier Electric Corporation, South Plainfield, N. J., a corporation of Delaware Application August 30, 1940, Serial No. 354,821

8 Claims. (Cl. 175—315)

The present invention relates to electrolytic capacitors, more particularly to a vent construction or safety device for relieving a capacitor from excess gas developed within the capacitor unit or section during its operation.

Electrolytic capacitors well known in the art depend for their action upon the properties of the dielectric or current blocking film or thin porous layer of aluminum oxide or oxide of other film-forming metals deposited upon at least one of the electrodes of the capacitor unit.

The invention has special advantages for so-called dry electrolytic capacitors which comprise two or more electrodes, at least one of which has a dielectric film formed thereon, separated by porous or absorbent spacers impregnated with a suitable viscous or paste-like electrolyte solution. Usually, the interleaved electrodes and spacer elements are in the form of strips wound into a roll to form a convolute capacitor unit or section mounted in a suitable container.

As is well known, during the operation of electrolytic capacitors, that is when an electric voltage is applied to the electrodes of the capacitors, copious quantities of gas may be developed within the capacitor unit due to various causes such as high alternating current ripple of a direct operating voltage, accidental polarity reversals in so-called polarized capacitors comprising a filmed and non-filmed electrode or due to a too rapid reforming of the dielectric or blocking film after prolonged periods of idleness and many other reasons well known to those skilled in the art.

Moreover, it has become general practice to protect the capacitor units against absorption of moisture and other undesirable agents which may have a deleterious or destructive effect on the capacitor by mounting and hermetically sealing the units in a suitable container or casing. Such casings for electrolytic capacitors sealed in this manner will be subject to destruction by rupture, in some cases with explosive violence, due to the development of excess gas pressure therein during the operation of the capacitor unless a suitable safety device or vent is provided to allow the undesirable excess gas to escape from the interior of the capacitor to the outside.

Safety or venting devices as heretofore used are both expensive, ineffective and unreliable in their operation especially when large quantities of gas are generated within the capacitor unit.

Accordingly, an object of the present invention is to provide a vent or safety device for electrolytic capacitors which is both simple in design and efficient in operation.

Another object is to provide a vent particularly suitable for electrolytic capacitors of the dry type.

These and further objects and aspects of the invention will become more apparent from the following detailed description taken with reference to the accompanying drawing forming part of this specification and wherein:

Figure 1 is a vertical cross-sectional view of a dry electrolytic capacitor embodying a safety vent constructed in accordance with the invention, Figure 2 is a top view of a vent element showing a modification of the invention, Figure 3 is a vertical cross-section of the vent structure according to Figure 2.

Referring more particularly to Figure 1, there is shown an electrolytic capacitor of the dry type comprising in a known manner a convolute or rolled capacitor unit 10 which may consist of two electrode strips of aluminum or other film-forming metal separated by strips of absorbent material such as gauze or paper impregnated with a suitable electrolyte solution, the superposed electrode and spacer strips being wound into a rolled capacitor unit with tabs 11 and 11' extending from the electrodes at opposite ends of the unit. The tabs are electrically connected to suitable terminal leads such as flexible wire elements 13 and 13', respectively, by means of rivets or eyelets as shown at 14 and 15, respectively. The capacitor unit is mounted in a casing 17 such as a cardboard tube impregnated with a suitable wax or the like to render it moisture proof. Tube 17 extends beyond the edges of the unit 10 to provide compartments or spaces filled with wax as shown at 16 and 16' or any other sealing compound to effect a hermetic seal for the entire capacitor unit from the outside atmosphere.

According to the present invention there is provided a safety device or vent arrangement comprising a dome shaped or vaulted cover member 20 of metal, hard rubber or other suitable material placed over one end of the capacitor unit so as to provide an open space 19 within which the gases developed during the operation of the capacitor will accumulate. The cover member 20 is formed with a tubular extension 21 produced by an extrusion or molding process or in any other suitable manner and passing through the sealing compound 16 to provide a channel or passage connecting the space 19 with the outside atmosphere. This channel is filled with a suitable wax 22 or other low melting point sealing substance in such a manner that with a certain critical gas pressure and attendant temperature being developed in the space 19, the wax 22 will melt or soften sufficiently to allow the undesirable excess gas to escape to the outside, thus preventing the capacitor from rupture and destruction.

In the example shown, the cover member 20 also serves as an anchoring or supporting element for the tab-to-terminal joint effected by the eyelet 15 to prevent the electrical contact from becoming loose during shipment and mounting of the capacitor.

As is understood, the sealing wax or equivalent substance 16 and 16' should have a substantially higher melting point than the wax 22 or equivalent sealing substance filling the vent hole or tube 21 to permit only the latter to be affected by the excess temperature and to ensure an efficient and dependable operation of the safety device.

During ordinary operation, the capacitor may sometimes be subjected to ambient temperatures high enough to cause the wax 22 in the vent hole to melt and in order to prevent this drawback and to enable a repeated operation of the vent under moderate excess pressure, the tube or vent hole 21 according to a further improvement is given a suitable length and diameter to obtain a capillary action for the particular wax used in its molten condition, thereby preventing the molten wax from running out and rendering the safety device inoperative. In this manner the capacitor will remain completely sealed during normal operating conditions and only a predetermined critical gas pressure developed in the space 19 will result in an operation of the vent in allowing the excess gas to readily escape to the outside in the manner described.

In the construction shown in Figure 1, the cover 20 is provided with an opening for mounting the eyelet 15 connecting the electrode tab 11 to the terminal wire 13. In Figures 2 and 3 there is shown a modified construction wherein the vent tube and anchoring eyelet are combined in a single element. For this purpose, the cover 25 has a flat central portion 26 provided with an opening for mounting an eyelet 28 providing a vent hole filled with a suitable low melting wax 27. The eyelet 28 furthermore serves as a connecting and anchoring means for the terminal wire 13 and the electrode tab 11 in a manner substantially similar to Figure 1. A stiffening collar 29 encircling the eyelet 28 may be provided to enable the eyelet to be extended sufficiently to obtain a capillary effect and prevent the wax 27 in molten condition from running out in a manner described hereinabove.

There is thus provided by the invention an electrolytic capacitor unit preferably of the rolled type enclosed in a moisture proof casing having at least one open end hermetically sealed by means of a high melting point wax or equivalent substance and having embodied therein a vent comprising a tubular member passing through the wax seal and being filled with a relatively low melting point wax or equivalent substances capable of becoming sufficiently soft when a critical gas pressure and attendant temperature is developed within the capacitor unit so as to instantly allow the undesirable excess gas to escape to the outside. It will be evident from the foregoing that the invention is not limited to the specific construction and arrangement of parts shown and disclosed herein for illustration but that variations and modifications may be made which will suggest themselves to those skilled in the art and coming within the scope defined by the appended claims.

I claim:

1. The combination with a hermetically sealed container enclosing a device liable to develop excess gas during operation, said container having an opening closed by a mass of sealing material being solid at normal temperature, of a vent structure comprising a vaulted member arranged intermediate said device and sealing mass to provide a space for accumulating gases developed by said device, a tube extending from said element through said sealing mass and connecting said space with the outside atmosphere, and a filling of relatively low melting point sealing substance within said tube.

2. The combination with a hermetically sealed container enclosing a device liable to develop excess gas during operation, said container having an opening closed by a mass of relatively high melting point sealing wax, of a vent structure comprising a vaulted member arranged intermediate said device and said sealing mass to provide a space for accumulating gases developed by said device, a tube extending from said member through said mass and connecting said space with the outside atmosphere, and a filling of relatively low melting point sealing wax within said tube.

3. The combination with a hermetically sealed container enclosing a device liable to develop excess gas during operation, said container having an opening closed by a mass of relatively high melting point sealing substance, of a vent structure comprising a vaulted member arranged intermediate said device and sealing mass to provide a space for accumulating gases developed by said device, said member having an extruded tubular element passing through said mass and connecting the interior of said container to the outside atmosphere, and a filling of relatively low melting point sealing substance within said element.

4. The combination with a hermetically sealed container enclosing a device liable to develop excess gas during operation, said container having an opening closed by a mass of relatively high melting point sealing material, of a vent structure comprising a vaulted member arranged intermediate said device and sealing mass to provide a space for accumulating gases developed by said device, a tube extending from said element through said sealing mass and connecting said space with the outside atmosphere, and a filling of relatively low melting point sealing substance within said tube, said tube having a diameter so as to produce capillary attraction for the sealing substance therein in its molten condition.

5. The combination with a hermetically sealed container enclosing an electrical device liable to produce excess gas during operation, said container having an opening closed by a mass of relatively high melting point sealing substance, of a vent structure comprising a vaulted member arranged intermediate said device and said mass to provide a space for accumulating gases developed by said device, a tube extending from said member through said mass and connecting said space with the outside atmosphere, a filling of relatively low melting point sealing substance in said tube, an electrical connection from said device to said member, and terminal lead means passing from said member through said mass to the outside of said container.

6. The combination with a hermetically sealed container enclosing an electric device liable to produce excess gas during operation, said container having an opening closed by a mass of relatively high melting point sealing material, of a vent structure comprising a vaulted member arranged intermediate said mass and said device to provide a space for accumulating gases developed by said device, a hollow eyelet mounted in said member, said eyelet passing through said mass and connecting said space with the outside atmosphere, a filling of relatively low melting point sealing substance within said eyelet, and terminal leads extending from said eyelet to said device and to the outside of said container through said sealing mass, respectively.

7. The combination with a hermetically sealed container enclosing a device subject to generation of excess gas, of a vent structure for said container comprising a cap mounted within said container adjoining to said device to provide a space for accumulating gases developed by said device, a tube extending from said cap and connecting said space with the outside of said container, and a filling of sealing substance meltable at a predetermined excess temperature within said tube.

8. The combination with a hermetically sealed container enclosing a device subject to generation of excess gas, of a vent structure for said container comprising a cap mounted within said container adjoining to said device to provide a space for accumulating gases developed by said device, a tube integral with and extending from said cap and connecting said space with the outside of said container, and a filling of sealing substance meltable at a predetermined excess temperature within said tube, said tube having an inner diameter to produce capillary attraction of said sealing substance in its molten state.

PAUL McKNIGHT DEELEY.